Dec. 30, 1930.  F. C. MERRILIES  1,787,117
WEARING APPAREL
Filed Aug. 29, 1930   2 Sheets-Sheet 1
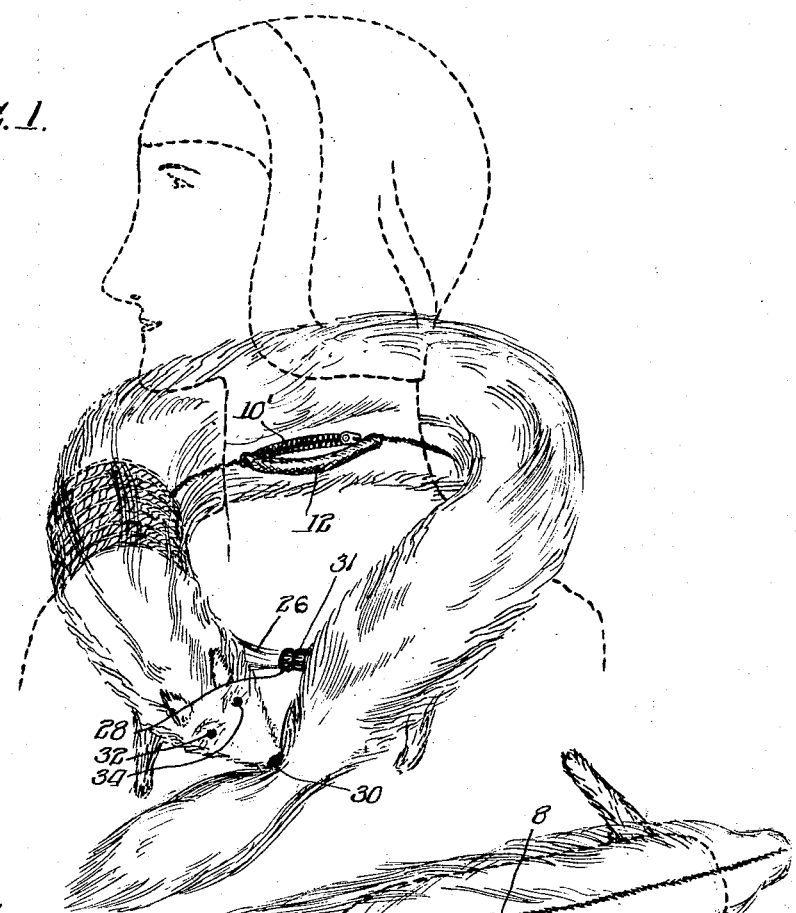
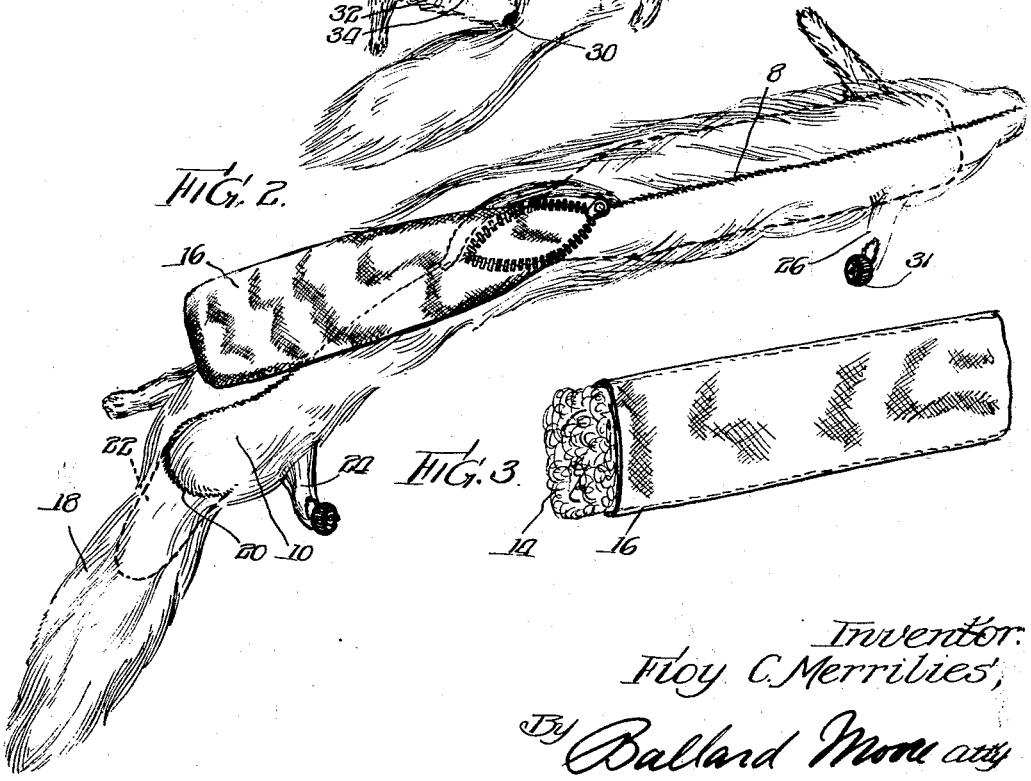
Inventor:
Floy C. Merrilies,
By Ballard Moore atty Dec. 30, 1930. F. C. MERRILIES 1,787,117
WEARING APPAREL
Filed Aug. 29, 1930 2 Sheets-Sheet 2
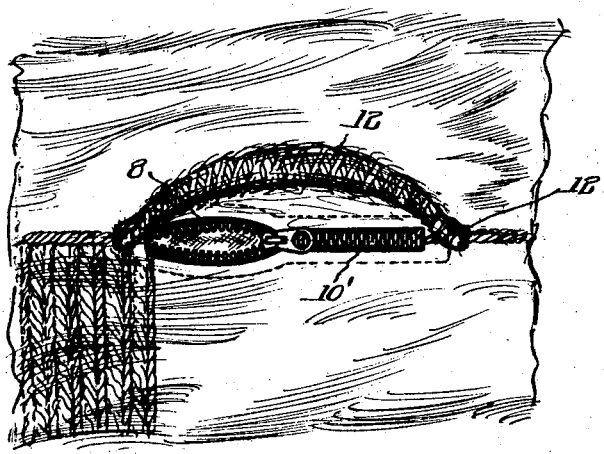
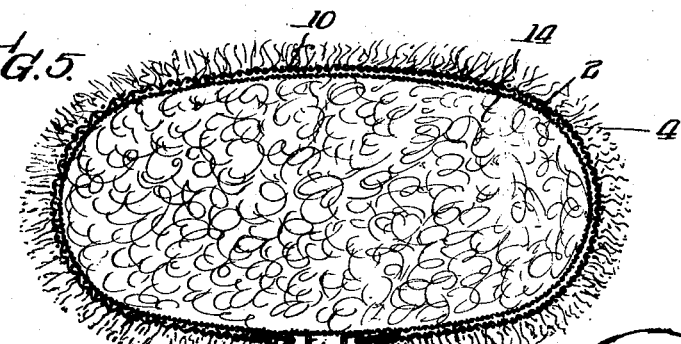
Inventor:-
Floy C. Merrilies,
By Ballard Moore atty.

Patented Dec. 30, 1930

1,787,117

UNITED STATES PATENT OFFICE

FLOY C. MERRILIES, OF CHICAGO, ILLINOIS

WEARING APPAREL

Application filed August 29, 1930. Serial No. 478,582.

This invention relates to ladies' wearing apparel, and the objects of my invention are to provide a fur neck-piece or scarf or muff which presents not only an attractive appearance, but is warm, shapely and inexpensive, easy to wash and therefore more sanitary than fur neck-pieces and other padded scarfs or boas, and has the further advantage that the same can be made of any color or combinations of colors desired.

Another object of my invention resides in providing a lady's neck-piece or scarf of knitted or crocheted fabric constructed and arranged to simulate a fur-bearing animal neck-piece, which is provided with a quickly detachable inner padding or stuffing to lend warmth and characteristic shape, but which may be removed so that the scarf may be washed for cleaning.

Yet another object of my invention resides in providing a lady's neck-piece in simulation of a fur neck-piece and formed of knitted or crocheted Angora yarn constructed in such a manner that the tail of the animal forming the neck-piece provides a pocket for a handkerchief or the like.

Yet another object of my invention resides in the manner of forming an opening in the under side of the body of the simulated animal neck-piece for the insertion of a padding or filler animal, and in the arrangement of the knitted or crocheted strip adapted to overlie the opening to hide the same, while at the same time forming a convenient handle by which the neck-piece may be held.

Yet another object of my invention resides in the particular means of knitting or crocheting the tubular blank forming the body of the imitation animal neck-piece, and particularly in the manner of forming the eyes and mouth at the head of the animal whereby to permit the free removal and insertion of the filler.

These and other objects of my invention will be apparent from the perusal of the following specification, when taken in connection with the accompanying drawings, wherein:

Figure 1 is a view of the neck-piece as drawn about the neck and shoulders of the wearer;

Figure 2 is a perspective view of the underneath side of the neck-piece showing the slit and the manner of inserting the padding;

Figure 3 is a perspective view of the padding or filler;

Figure 4 is a view of the manner of forming the slit and rip strip closing the same;

Figure 5 is a sectional view of the rip strip; and

Figures 6 and 7 are modifications of other forms of the improved neck-piece.

Referring now to the drawings in detail, the invention consists in forming the neck-piece or scarf as a tubular knitted or crocheted body of yarn, preferably Angora yarn, which has characteristic long hairs. By using a very close stitch in the crocheting or knitting operation, the simulation or appearance of a piece of fur is made quite perfect, although it is obvious that a more open stitch may be used if desired.

In the construction of a lady's neck-piece made in simulation of a fur-bearing animal, a relatively long and narrow Angora yarn fabric is knitted or crocheted. In Figure 5 of the drawings this tubular body 2 is clearly seen as knitted of Angora yarn which has the usual relatively long hairs 4 extending therefrom in simulation of fur. If desirable, the tubular body may be formed of a rectangular blank, same being relatively long and narrow, and then the longitudinal edges of the blank may be knitted, crocheted, or sewed together to form the long, narrow tubular body. After this is formed, the exposed ends may be closed by crocheting, knitting or sewing.

As is well known, yarn, and particularly Angora yarn, can be cleaned very easily by washing in ordinary soap and water or other cleaning fluid, and when so washed, the appearance will be even enhanced, as the hairs stand out and appear to be even longer. In order to provide a lady's neck-piece or scarf or muff which simulates a fur piece of this character, means is provided for permitting it to be washed, and to this end, during the knitting of the blank, a relatively long slit or opening 6 is left or formed in the side of the blank at the junction 8 where the two longitudinal edges are knitted, crocheted or sewed together. Means is provided for not only closing this opening, but at the same time permitting it readily to be opened for the insertion or withdrawal of a filler hereinafter described. To this end any type of fastening means such as buttons, hooks, snap fasteners or the like may be used. Preferably a so-called rip-strip fastener may be sewed to the free edges of the opening 8 so that the same may be readily closed. In addition, means is provided for normally overlying this fastening means 10', the same comprising a relatively wide knitted or crocheted band 12 of the yarn which normally overlies the rip-strip opening. This band is free at its central points of the knitted body, but is integrally united or knitted at its ends to the knitted body, so that this band 12 forms a handle for holding the fur.

In order to give an animal characteristic to the neck-piece, a filler or stuffing 14 is provided. This filler or stuffing 14 comprises preferably loose wool as a filler and an envelope 16 of silk or other fabric. The stuffing or filler is relatively long and narrow, and substantially the size or diameter of the neck-piece. It is inserted through the rip-strip opening in the side, and when in position entirely fills the tubular body 10 from one closed end to the other. This filler is relatively light and warm, but readily preserves its shape, and when placed within the tubular knitted fabric adds warmth and shape thereto. Obviously, when it is desired to wash the scarf, the rip-strip may be opened, the filler withdrawn, and the body portion washed in soap and water and hung until dry, and then the filler is re-inserted. After cleaning, the scarf is even better than when new.

The tail portion of the knitted tubular body may be formed integrally with the longitudinal blank, forming the tubular body, or may be knitted on to the body portion after the former is finished. In any event, the knitted or crocheted tail portion 18 begins at the closed end 20 of the blank indicated in Figure 2, and tapers gradually to a substantial point in simulation of the tail of the usual fur neck-piece. In forming this tail, the knitting operation is carried out so as to leave a pocket 22 which is open adjacent the line of juncture 20 with the tubular body portion 10, so that the pocket 22 forms a convenient receptacle for a handkerchief or the like.

In addition, one or more feet 24 or 26 may be knitted or crocheted to the body portion at appropriate points and may be provided with snap fasteners 28 and 31 so that when fastened together, these feet 24 and 26 may hold the neck-piece about the neck of the wearer.

The other end of the tubular body portion 10 is formed in simulation of a head. This is done quite simply. At the time the tubular blank is formed and after both ends are closed, the two opposite corners of one end are then brought together and crocheted or knitted together at the extreme corners and are likewise knitted together at a distance of about one-half inch inwardly from the extreme end of the blank, thus forming a sort of mouthpiece 30. At this time two black buttons 32, 34 may be attached to the end at appropriate positions to form the spaced-apart eyes shown in Figure 1. These buttons may be secured either by sewing or crocheting or knitting or by metal staples passing all the way through to hold the two buttons in place. It is preferred not to have the means for holding the buttons forming the eyes interfere with the free removability of the filler or stuffing member, and therefore the fastening means will be located beyond the end of the stuffing member when it is inserted in position. It is obvious that other means may be availed of for forming the eyes and mouth; they may be formed by knitting or crocheting relatively dark or black dots, squares, or circles, and the mouth may be formed in any other approved and convenient manner except that the manner of forming the mouth and eyes outlined herein appears to be at the present time the most practical.

Above the eyes and properly spaced to give the appearance of ears are two crocheted or knitted flaps gradually tapered at the top to simulate ears, as shown in Figure 1.

In Figures 1 and 4, I have shown a short section of the neck-piece as of knitted or crocheted construction, but it will be understood that the entire animal is formed of this knitted or crocheted stitch. The term "knitted or crocheted" is intended to designate any means of forming a fabric of yarn by a looping or intertwining operation.

In Figures 6 and 7 of the drawing, there are shown two different styles showing the improved imitation fur neckpiece, it being understood that the invention herein described is applicable to the formation of a muff with a removable liner to permit cleaning by washing and the subsequent replacement of the filler of wool with its encasing bag.

It must be understood, of course, that the scarfs or neck-pieces may be crocheted or knitted in any desired way, by machine or otherwise. They are not necessarily made from a rectangular blank, but may be knitted on the machine, the body and tail being formed in continuous operation. It will also be apparent that tassels or ribbons may be attached to the ends of the body portion for tying or fastening the scarf on the neck of the wearer in lieu of the device shown in the present drawing. In fact, Figures 6 and 7 of the drawing illustrate this modification.

The advantages of the present invention are many. Because of the knitted texture of the body, it is quite flexible and readily conforms to the shape of the filler, which may be either round or flat, whichever suits the desired configuration of the animal or other shape selected. Furthermore, the knitted yarn may be made in any color or combinations of colors desired, so that the gown may be readily matched, and thus an imitation fur neck-piece of any desired color may be very cheaply procured. Furthermore, by the utilization of this light yarn and a light filler of lamb's wool encased in a silk envelope, a very light yet warm neck-piece is provided, which readily maintains its shape and beauty.

Another important advantage resides in the characteristic construction whereby the filler may be quickly withdrawn for the purpose of permitting the animal-like body to be washed. It is well known that Angora yarn, when washed, is readily cleaned and presents a more fur-like appearance than before washing. In addition, the knitting operation permits the formation of a pocket or receptacle at any desired position of the body, and permits of the ready formation of fastening means as a knitted integral part of the body, and permits of the ready formation of any desired shape of body, none of which advantages are present in fur neck scarfs. At a relatively short distance the Angora knitted or crocheted neck-pieces are practically a perfect imitation or simulation of a fur-bearing animal neck-piece.

Still another advantage of my invention resides in the ready adaptability of the knitting or crocheting operation, particularly in the use of the soft, flexible yarn for the formation of any desired type of animal in the making of a scarf or neck-piece, and particularly in the formation of various shapes of heads for the animal. In the present instance, while the animal head shown is the usual type of the two eyes and the nose and the ears, it is obvious that any characteristic shape and formation of animal head and ears and eyes and nose may be provided. It is also plain that the scarf has a further advantage that various animal color combinations may be easily and cheaply availed of in the knitting operation to simulate the various animals.

In certain aspects of the invention, where it is desirable to use Angora yarn, I, of course, also include imitation Angora yarn or brushed yarn or any other type of yarn which provides the hair-like surface. In certain other aspects of the invention, any ordinary type of yarn may be used.

Having thus described my invention, what I claim as new and desire to secure by Letters Patent is:

1. An imitation animal neck scarf formed of yarn knitted or crocheted to provide a relatively narrow, tubular body of sufficient length to embrace the neck and shoulders of the wearer, and a separable filler comprising a body of light, warm material enclosed in an envelope, said filler being positioned within the tubular fabric body, said fabric body having a slit or opening to permit the removal of said filler, whereby said fabric body may be washed for cleaning, and means for closing said slit, said filler when positioned within the tubular body being constructed and arranged to give warmth and characteristic shape to the scarf.

2. A neck scarf made in simulation of a fur-bearing animal, consisting of a relatively tubular knitted or crocheted body of Angora yarn presenting a furry appearance, and wherein one of the extremities of said body is gradually tapered to simulate the tail of the animal, and wherein the opposite extremity is constructed and arranged to simulate the head of the animal, and a detachable filler disposed in said tubular body for rendering the characteristic shape thereto.

3. A lady's neck-piece formed in simulation of a fur-bearing animal, comprising a relatively long and narrow knitted or crocheted fabric of tubular formation having its ends closed, a filler therein comprising an envelope, and an internal stuffing of light, warm material, said tubular knitted fabric having an opening in its side for the removal of said filler, one end of said tubular fabric being formed in simulation of an animal's head, the other end of the tubular knitted or crocheted fabric being formed with a knitted or crocheted tail substantially tapered at its outer end and formed with a pocket having an open mouth adjacent the junction of the tail and the tubular body for the reception of a handkerchief or the like.

4. A lady's neck-piece comprising a relatively long and narrow body of crocheted or knitted yarn having its ends closed, a filler disposed within said body to give warmth and shape thereto, said body having a lateral slit, and a knitted or crocheted band overlying the slit with the ends of the band knitted or crocheted to the body, and with the intermediate portions of the band free thereof to provide a handle.

5. An imitation fur-bearing animal neck-piece for ladies' wear having a main body portion of tubular construction and formed of knitted or crocheted Angora yarn in simulation of fur, said tubular body being supported in simulation of animal shape by an independent filler or stuffing, said tubular body having an opening for the free insertion and removal of said stuffing, whereby to permit the washing of said tubular fabric after the stuffing has been removed.

6. A washable neck scarf comprising a tubular body of knitted or crocheted yarn, said body having a wall formed by opposed portions forming a permanent opening therein, and means permanently attached to said opposed portions and adapted substantially instantaneously to cooperate with each other for closing said opening, and a filler of light, warm material, an envelope for said filler, said envelope and filler adapted to be inserted through said opening, when opened, to give the tubular body shape, warmth and style.

In witness whereof, I have hereunto subscribed my name.

FLOY C. MERRILIES.